United States Patent
Kelly et al.

(10) Patent No.: US 6,678,826 B1
(45) Date of Patent: Jan. 13, 2004

(54) MANAGEMENT SYSTEM FOR DISTRIBUTED OUT-OF-BAND SECURITY DATABASES

(75) Inventors: Tadhg Kelly, Clifton, NJ (US); Don Snook, Newton, NJ (US); James McPherson, Fair Lawn, NJ (US); Wai Kong Sung, Jersey City, NJ (US)

(73) Assignee: Communications Devices, Inc., Clifton, NJ (US)

( * ) Notice: Subject to any disclaimer, the term of this patent is extended or adjusted under 35 U.S.C. 154(b) by 0 days.

(21) Appl. No.: 09/150,428

(22) Filed: Sep. 9, 1998

(51) Int. Cl.$^7$ .............................. G06F 17/30; G06F 7/00
(52) U.S. Cl. ............................................ 713/201; 707/9
(58) Field of Search ................................ 713/200, 201, 713/202; 707/1, 9, 10, 200, 201; 714/25, 48, 49, 57; 709/223, 224, 246, 248

(56) References Cited

U.S. PATENT DOCUMENTS

| | | | | |
|---|---|---|---|---|
| 4,694,492 A | * | 9/1987 | Wirstrom et al. | 713/159 |
| 5,249,230 A | * | 9/1993 | Mihm, Jr. | 380/249 |
| 5,276,735 A | * | 1/1994 | Boebert et al. | 713/167 |
| 5,377,267 A | * | 12/1994 | Suzuki et al. | 380/249 |
| 5,451,757 A | * | 9/1995 | Heath, Jr. | 340/5.4 |
| 5,499,297 A | * | 3/1996 | Boebert | 713/159 |
| 5,636,280 A | * | 6/1997 | Kelly | 713/155 |
| 5,737,525 A | * | 4/1998 | Picazo, Jr. et al. | 709/249 |
| 5,842,173 A | * | 11/1998 | Strum et al. | 705/1 |
| 5,924,094 A | * | 7/1999 | Sutter | 707/10 |
| 6,067,623 A | * | 5/2000 | Blakley, III et al. | 713/201 |
| 6,173,404 B1 | * | 1/2001 | Colburn et al. | 713/200 |
| 6,446,077 B2 | * | 9/2002 | Straube et al. | 707/103 Y |

OTHER PUBLICATIONS

Fuller, "Accredited Standards Committee X–9 Descriptive Information" Jun. 24, 2003, p. 1–4.*
"Comnet '98 Exhibit Description", p. 1.*
Kelly, "Why RADIUS and TACACS+ both fail to protect remote techician dial up access to the router/server", COMNET '98 Conference Paper, p. 1–2.*
"UniGard V.34, Overcome the weakness of RADIUS and TACACS regardless of the network status", Communications Devices Inc., p. 1–2.*
"UniGard V34, Secure out of band management encryption modem", Communications Devices Inc., p. 1–2.*

\* cited by examiner

*Primary Examiner*—Ayaz Sheikh
*Assistant Examiner*—Christopher Revak
(74) *Attorney, Agent, or Firm*—Siegmar Silber, Esq.

(57) ABSTRACT

For use during maintenance of wide area networks, a management system is disclosed for distributing security databases to security gates at each maintenance port of each network element. A distributed database manager is provided to instantaneously update the databases and gather from each database transaction records. Central to the distributed database manager is a software program that polls the security databases located at each of the network elements, deposits updated databases, and formats various management reports from transaction records and from device failure records (generated by the program). The software program enables the database manager to communicate with the network elements through either an in-band channel or an out-of-band channel. By shifting authentication of access seekers to security databases resident at each console port, security is maintained even though the network server is not in service. Using existing technology, all communications between the distributed database manager and the security database is in encrypted form.

9 Claims, 5 Drawing Sheets

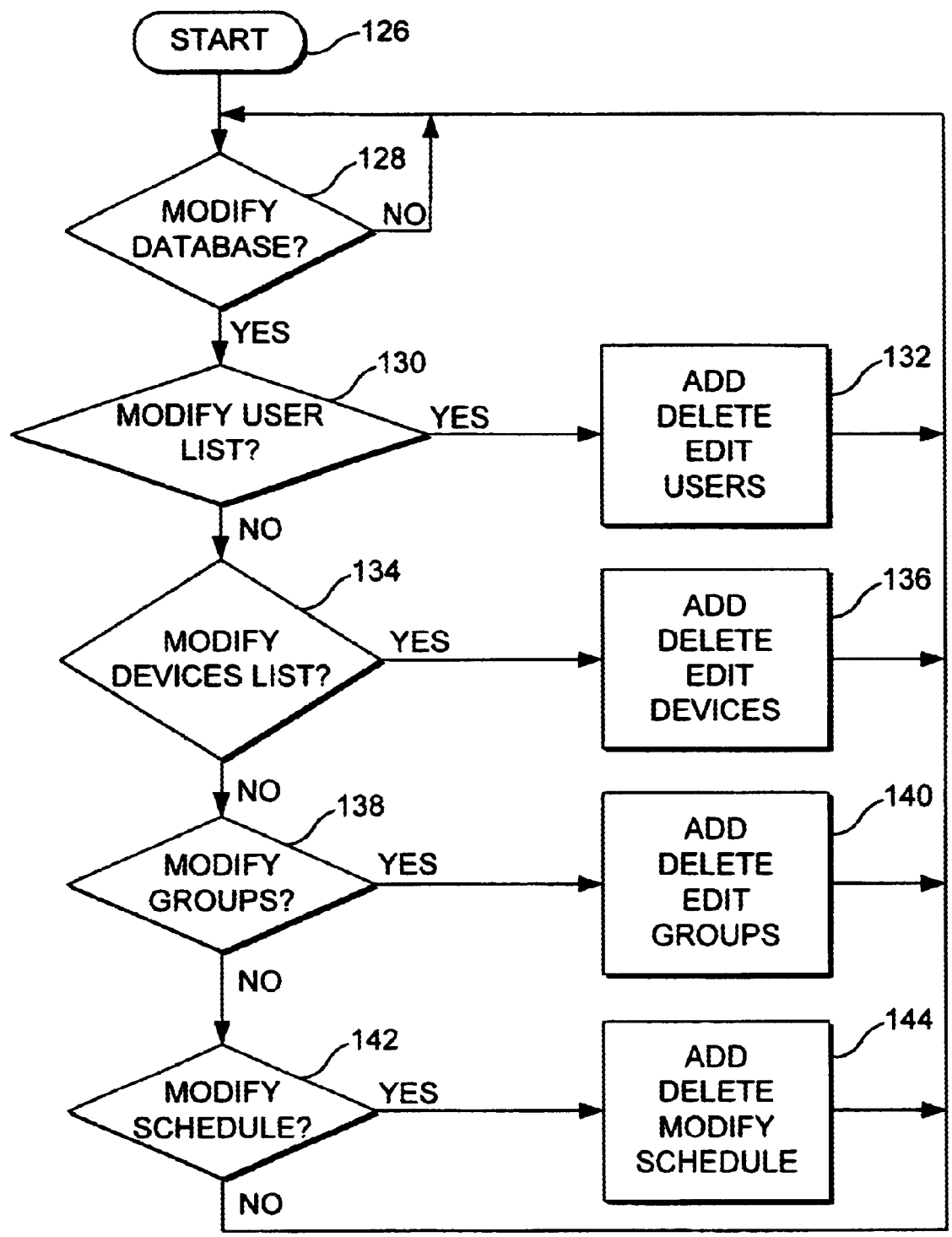
F I G. 3

MANAGEMENT SYSTEM FOR DISTRIBUTED OUT-OF-BAND SECURITY DATABASES

BACKGROUND OF THE INVENTION

1. Field of the Invention

The present invention relates to a management system for distributed out-of-band security databases. More particularly, the management system relates to security for computer networks and maintains security whether the network server is in-service or out-of-service. As the encryption and decryption of the security system of this invention are asynchronous, the management system of the security database is independent of time and event monitoring. With the management system hereof, remote access obtained by a technician to any network element or to any related distributed database thereof is secure through in-band or out-of-band routing.

2. Background Information

In the current technology, for direct access to the functions of the router/server, most routers provide a console maintenance port which is typically connected to a modem for convenient remote access. When a network problem occurs, the technician has several options depending upon the topological and geographical configuration of the network. A technician servicing a simple network, which is in close proximity to the router/server, is able for diagnostic testing to access directly the console maintenance port. In a more diverse and complex network there are more options with different consequences.

When the technician and the router are not in geographical proximity and a network problem occurs, one of several options are available. The technician can have someone at the remote site where the router exists diagnose the problem and report back by telephone. This requires having, at the site of the router, a person of similar skills and tools as the technician. Another option is for the technician to travel to the site. Besides losing the services of the technician during travel, this may also require an overnight stay. Alternatively, when a dial-up modem has been placed on the console/maintenance port of the router, the technician can dial into the modem at anytime. While this solves the remote diagnostic problem, a breach of security is created as anybody can now access the router/server as there is absolutely no security or audit. To minimize the breach of security, the technician may, by contacting someone at the remote site, have the modem operational only when a problem occurs. The attendant turns on the modem for diagnostic and maintenance work and turns off the modem when the work is completed. This requires a person at the remote site at all times, off-site diagnostic and maintenance work is proceeding, and may require attendance twenty four hours a day, seven days a week. At this point, security is dependent upon human factors, e.g. the person at the remote site remembering to turn off the modem, or purposely leaving the modem on out of laziness, or intentionally leaving the modem on so as to connect after hours unnoticed by the global security system.

More recently, the technology of a RADIUS or TACACS+ authentication server has become available for authenticating the dial-up call to a remote network element. These technologies each utilize a single network security server which must be accessed via the network each time security is required. While this provides a two-factor authentication, utilizing a token, as the operation of RADIUS or TACACS+ protocol requires network connectivity for operation, such authentication is impractical. In this case, if the router/server has network connectivity, the technician usually may gain access to the network to access through the router/server (an in-band route) and then is not limited by the data transfer rate over the telephone line, and, if the router/server does not have network connectivity, the technician is limited to dialing access through the console/maintenance port. Now because of the lack of network connectivity, the RADIUS/TACACS+ authentication is also inoperative and provides either no security or only default password security into the console/maintenance port. Another alternative is that the technician can install password modems at all the remote sites requiring dial-up access. While this solves the remote access problems, an unacceptable system is created as: (1) password authentication is weak and (2) security management becomes cumbersome. While it is widely accepted that two factor authentication should be used, such strong authentication modems are not commonly available. The security management defect results from having possibly hundreds of individual databases scattered around the network. Then, the updating of these databases and the obtention of audit information, if available, become manpower intensive activities.

In summary, RADIUS and TACACS+ do not address the problems associated with remote technician access to router/server ports. This problem can only be adequately addressed by strong authentication, centrally managed, secure access modems.

In preparing for this patent application the inventor became familiar with several patents in the field of security systems and security for databases. In general, most of the patents in this technology teach the manner in which a user is authenticated prior to gaining access through a centralized security database to a remote network element.

The patent to Wirstrom et al., U.S. Pat. No. 4,694,492 teaches the generating of a sequentially assigned event identifier by the host computer and encrypted into the authorization request by a remote network element, which thereupon sends an event-coded encryption to the host computer for authorization. Wirstrom et al. has a fixed key and a stored transitory key. This patent deals with a two-part encryptor. One part the user carried from site to site. The other remains at each site to receive the other part similar to an electronic identification card that allows you through electronically locked doors.

The patent to Mihm, Jr., U.S. Pat. No. 5,249,230 teaches the generating by the host computer of an encrypted credential that is then transmitted to and embedded in a remote device. Public key technology is then used to authenticate. This patent teaches the use of public key technology to authenticate the terminal. The system first assigns an equipment identifier and a user identifier for the terminal. Then the two identifiers are encrypted with a secret key and the encrypted date is stored on the remote terminal. A public key is sent to authentication nodes which receive the encrypted data using a public key and the authentication nodes then decrypt and compare.

The patent to Boebert et al., U.S. Pat. No. 5,276,735 teaches a type of complex system usually associated with LAN security and describes keys, identifiers, and rights and privileges. This system only involves protecting stored data and does not extend to data in transit. Also Boebert et al. teaches chaining sequential transactions together so that a break-in is detected by a number being out of sequence.

The patent to Suzuki et al., U.S. Pat. No. 5,377,267, teaches a system is based on a wireless network where two communication networks are required to authenticate the user.

The patent to Heath, U.S. Pat. No. 5,451,757 teaches a portable terminal connection to an automated teller machine (ATM). In the Heath '757 teachings, the user enters a two-part access code comprised of a personal identification number (PIN) and the portable terminal identifier. This entry is then compared at the host computer to an access code generated by the ATM. In contradistinction to the present disclosure, infra, this is not an out-of-band application insofar as operational control is by and through the host computer. Here, a secured message is transmitted to a remote technician, who after authentication, receives an encrypted message. The technician decrypts the message and reads an instruction, e.g. where he has to go to repair a disabled ATM. The system, because the files are check summed, encrypts only parts of an executable file.

The patent to Boeber, U.S. Pat. No. 5,499,297 teaches a plurality of hosts authenticating to a central security server. From the above discussion, it is seen that the long felt need for a management system for distributed, out-of-band security databases has not been met. Thus, the only totally secure and manageable remote access solution is to install strong authentication modems with a built-in centrally managed database. This disclosed system hereof eliminates the need for network connectivity for security network problems and outages. A centrally managed distributed security database allows a single management station to control access to thousands of router ports and to ensure the highest level of authentication for each attempt at access. The central manager, which connects both via network and dial line in case of outages, also provides daily audit reports from each modem containing a detailed list of all events on the modem.

SUMMARY

The present invention overcomes the problems in prior art security facilities for wide area networks during maintenance thereof. In this invention, security databases are distributed at the console or maintenance port or each network element. A distributed database manager is provided to instantaneously update the databases and gather from each database transaction records. Central to the distributed database manager is a software program that polls the security databases located at each of the network elements, deposits updated databases, and formats various management reports from transaction records and from device failure records generated by the program). The software program enables the database manager to communicate with the network elements through either an in-band channel or an out-of-band channel. By shifting authentication of access seekers to security databases resident at each console port, security is maintained even though the network server is not in service. Using existing technology, all communications between the distributed database manager and the security database is in encrypted form.

OBJECT AND FEATURES OF THE INVENTION

It is an object of the present invention to provide a management system for distributed out-of-band security databases.

It is a further object of the present invention to provide a secure modem to protect remote access to the router console port.

It is yet another object of the present invention to provide a system of encrypted communications wherein all the authentications therein are asynchronous.

It is still yet another object of the present invention to provide a distributed database security system integrated with advanced modem management capabilities.

It is a feature of the present invention that the session keys are randomly generated and are nonsequential from one to the next.

It is another feature of the present invention that security databases are distributed to remote network elements and, even when the central database of the server is out-of-service, the system provides security therefor.

It is yet another feature of the present invention that the security device thereof may employ a challenge response which is an encrypted authentication based on a secret key in the remote technician's hand held device or based on an encrypted file in the host authenticator's security database.

Other objects and features of the invention will become apparent upon review of the drawings and the detailed description which follow.

BRIEF DESCRIPTION OF THE DRAWINGS

In the following drawings, the same parts in the various views are afforded the same reference designators.

FIG. 3 is a flow chart showing the database functions of the security system of the invention shown in FIG. 2.;

DESCRIPTION OF THE PREFERRED EMBODIMENTS

Figure 1:
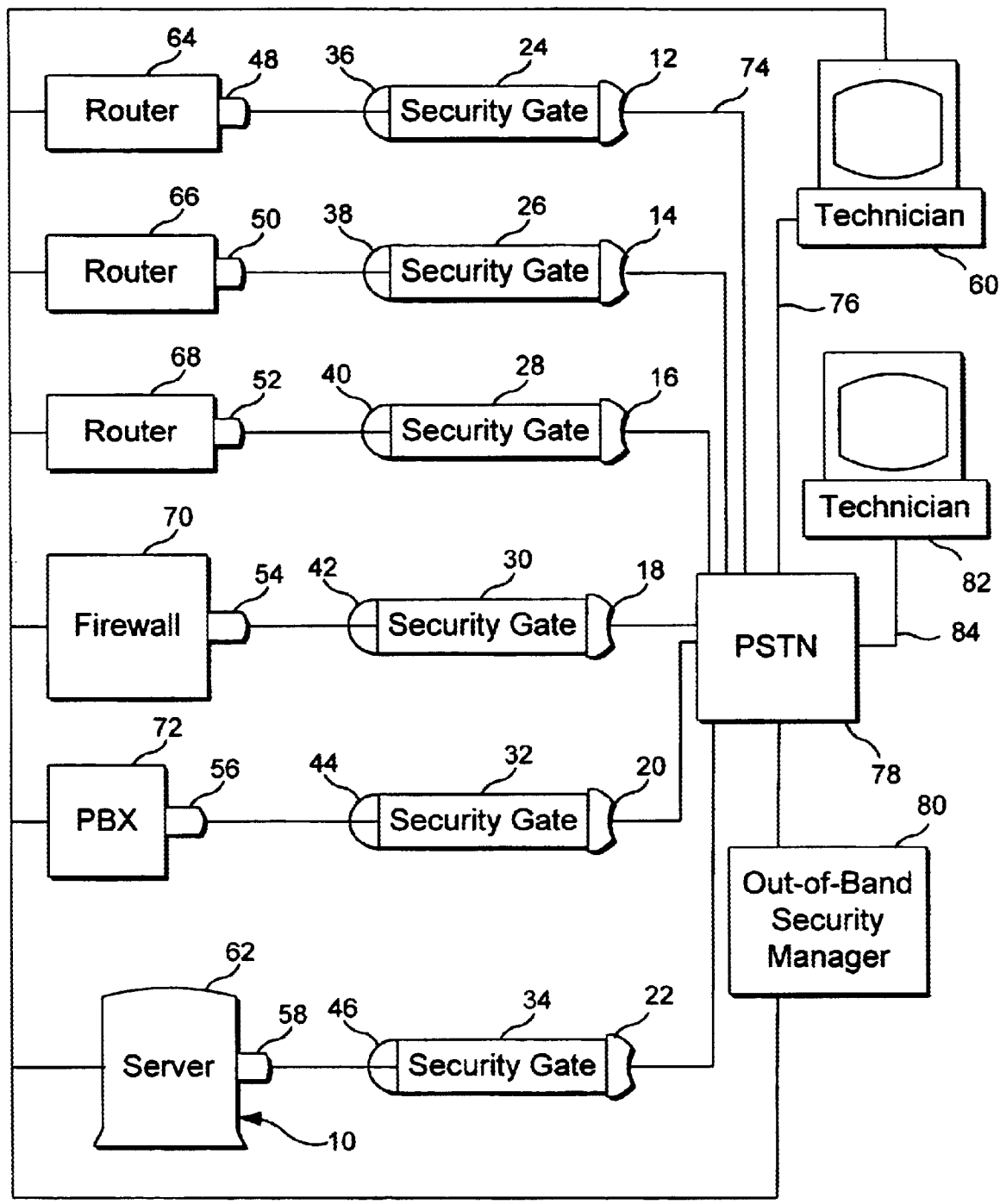
FIG. 1 is a schematic diagram illustrating a typical security system having distributed out of band security databases.

The invention described herein is of a system with totally secure and manageable remote access accomplished by the installation of a strong authentication modems with a network independent, centrally managed database. This system eliminates the need for network connectivity for out-of-band security, which security is fully operational even during network problems and outages. The centrally managed modems with resident databases therewithin allow a single management station to update the security databases and to control access to thousands of router ports to ensure the highest level of authentication for each attempt at access. The central manager, which connects both via network and dial line in case of outages, can also provide daily audit reports from each modem containing a detailed list of all events on the modem.

The security system described herein supplements normal network security. The system enables a network to be secure at all times and, even when the network server is non-functional, maintains the network in a secure condition. For purposes of discussion, the normal access route through the network server is considered in-band or "front door" entry and access through, for example, a dial-up modem at the maintenance or console port is considered out-of-band or "back door" entry. It has been common in the past to either secure the front door and leave the back door unattended or to secure the front and back doors by a system dependent upon the functioning of the network server. In the latter case, security is lacking when the server is non-functional and, in the absence of security, servicing personnel gain access through the back door.

The out-of-band security system of this invention consists of a security data-base which is replicatable for placement within a plurality of gates connected to the console (maintenance) port of a remote network element; a security gate at each console port of the network element structured to accommodate the security database.

In today's large networks, security issues concerning access are addressed on a global basis with large expensive central security databases protecting access anywhere in the network. This access is typically for the network user community, those who live and work on the network, secretaries, engineers, salespeople, executives, all sharing e-mail, data and ideas.

While the network is operating flawlessly, this topology works. However, a problem arises when inevitably a part of the network or the whole network is inoperative. This frequently prevents users from accessing the network that they depend upon for processing their work and, if the dependency is total, productivity halts.

When the network or part of the network is inoperative, a team of technicians are assigned to troubleshoot the system. When the network server is unavailable, this is accomplished by out-of-band communication to suspected network elements. When malfunctioning elements are found, such, elements may be reprogrammed or bypassed to return the network to operating condition. Such communications are usually completed through a dial-up modem connected to a serial console or maintenance port on the network device. The data transfer rate of this out-of-band communication is not at the same rate as through the primary traffic channel of the network, but is at the baud rate of the modem. Managing these communication devices is defined herein as "out of band management". Most companies manage out-of-band communications traffic through the console port and in that way do not load unnecessary traffic onto the network. While reasons for employing out-of-band managements vary, any network that cannot afford to be out of service for any length of time needs out-of-band management to control and direct the maintenance port traffic.

Referring now to FIG. 1, a schematic diagram is shown illustrating a typical out-of-band security system, referred to generally by the reference designator 10. The system has distributed out-of-band databases, 12 through 22 that are resident in security gates 24 through 34, respectively. Each of these security gates function with a respective one of the dial-in modems 36 through 46. As will become clearer from the discussion which follows, the security gates control access through the modems to the maintenance or console ports 48 through 58. With this arrangement, a technician 60, when the network server 62 is operable is provided with access after clearing in-band network security to network elements (routers 64, 66 and 68; firewall 70, and PBX unit 72) through in-band connection 74. When the network server 62 is inoperative, a technician 60 is provided with access through out-of-band connection 76, telephone network 78, and, by way of example through security database 16, security gate 28, and dial-in modem 40 to console port 52 of router 68. In the example just recited, an out-of-band security node is formed by the security database, the security gate, and the dial-in-modem. It is explained in greater detail, infra, the database maintenance, communications, and reporting functions are managed by the out-of-band security manager 80. It is noted that, while some technicians might enjoy network-wide authentication, the out-of-band security system is programmable to discriminate and permit limited access to some users and unlimited to others. Thus, while many systems require only a single security database, others which establish a hierarchy among remote users employ a plurality of security databases within the central processing unit (CPU) of the database security manager. Each of these databases are capable of being replicated by the CPU with each of the security database providing a set of authentication data. Besides being arranged by a hierarchy the clearance levels of the individual remote users, another plurality of databases maybe an interrelated hierarchical series of authentication data with each successive one of said databases being more restrictive as to the accessibility of the network elements by said remote users. Thus, in the latter example, a subcontractor maintenance technician 82, might only be granted access through an out-of-band route 84, as described above, and only to specific network elements.

Figure 2:
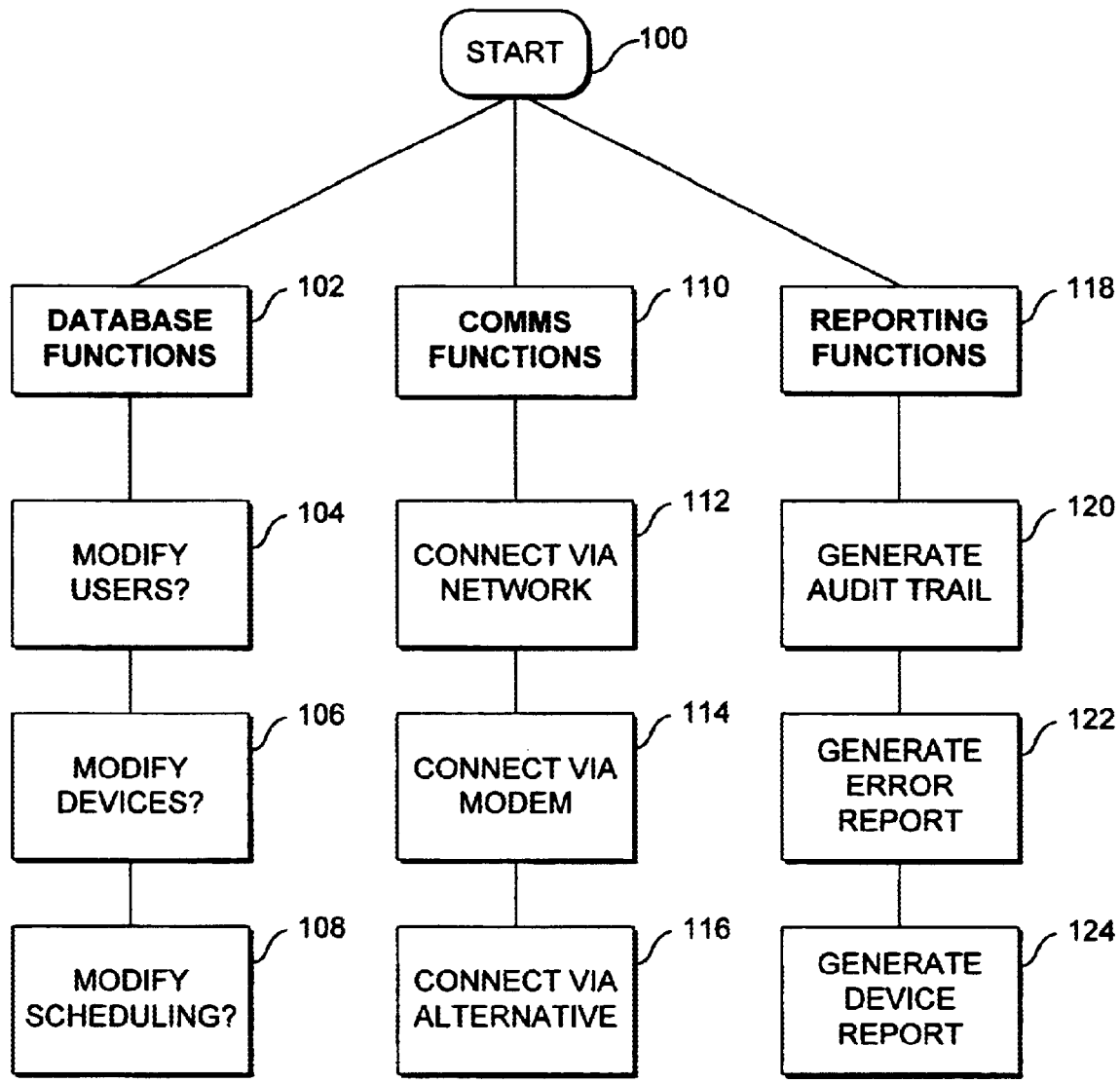
FIG. 2 is a system block diagram of the security system shown in FIG. 1.

Referring now to FIGS. 2 through 5, the software program for the management system for distributed out-of-band security databases is shown. Database management is provided to automatically and instantly update distributed databases located at the security gates at the out-of-band ports of the network elements. FIG. 2 provides an overall block diagram of the management functions. The logical pathway commences at START block 100 and array of functions or management modes is presented. The program menu and submenus are shown in FIG. 2. The menu first provides a DATABASE FUNCTIONS block 102, which when selected, provides various avenues for modifying the distributed databases. The databases include authentication information as to users, a list of devices, and a schedule for prevention maintenance or other calendar events, such as monthly reports. To change database information, when staffing changes occur, the submenu MODIFY USERS? block 104 is initiated. To change database information, when equipment beyond a given security gate is changed or updated, the submenu MODIFY DEVICES? Block 106 is initiated. To change database information when scheduling changes occur, the submenu MODIFY SCHEDULING? block 108 is initiated. The menu next provides a COMMS FUNCTIONS block 110, which, when selected provides various routes to connect to the databases-to-be-updated. Here, the submenu enables one to select a connection through the network at CONNECT VIA NETWORK block 112, through the applicable modem at CONNECT VIA MODEM block 114, or through an alternate pathway at CONNECT VIA ALTERNATIVE block 116. The menu further provides a REPORTING FUNCTIONS block 118. This function enables the database manager to collect information as to personnel and equipment and to make decisions based on productivity, effectivity, and reliability. The report submenu selection selects the format of the data report required and initiates the generation of the desired report. The database administrator may select GENERATE AUDIT TRAIL block 120, to receive an access report of date, time, user identification and the action taken. If the GENERATE ERROR REPORT block 122 is selected, then a report having the same transactional information is generated, however, the report is limited to invalid user data. The third report available pertains to devices and selecting GENERATE DEVICE REPORT block 124 provides a report of equipment malfunction occurrences.

Referring now to FIG. 3, a flow diagram for the updating of the database is shown. The program, through a series of prompts, guides one stepwise along to complete the updating. At each step, one is permitted to add, delete, or edit information. The updating program is begun at START block 126 and the user is immediately prompted by the query MODIFY DATABASE? block 128. If the user's response is negative, the user is returned to the point of beginning. If the user's response is positive, the user is prompted by the query MODIFY USER LIST? block 130. If YES, the user at ADD, DELETE, EDIT USERS block 132 provides corresponding data. If NO, the user is prompted by the query MODIFY DEVICES LIST? block 134. If YES, the user at ADD, DELETE, EDIT DEVICES block 136 provides corresponding data; If NO, the user is prompted by the query MODIFY GROUPS? block 138. If YES, the user at ADD, DELETE, EDIT GROUPS block 140 provides corresponding data. If NO, the user is prompted by the query MODIFY SCHEDULE? block 142. If YES, the user at ADD, DELETE, MODIFY SCHEDULE block 144 provides corresponding data. Upon a NO response, being received after the query MODIFY SCHEDULE? block 142 and after completion of any of the add, delete, and edit functions recited above, the use is returned to the point of beginning.

Figure 4:
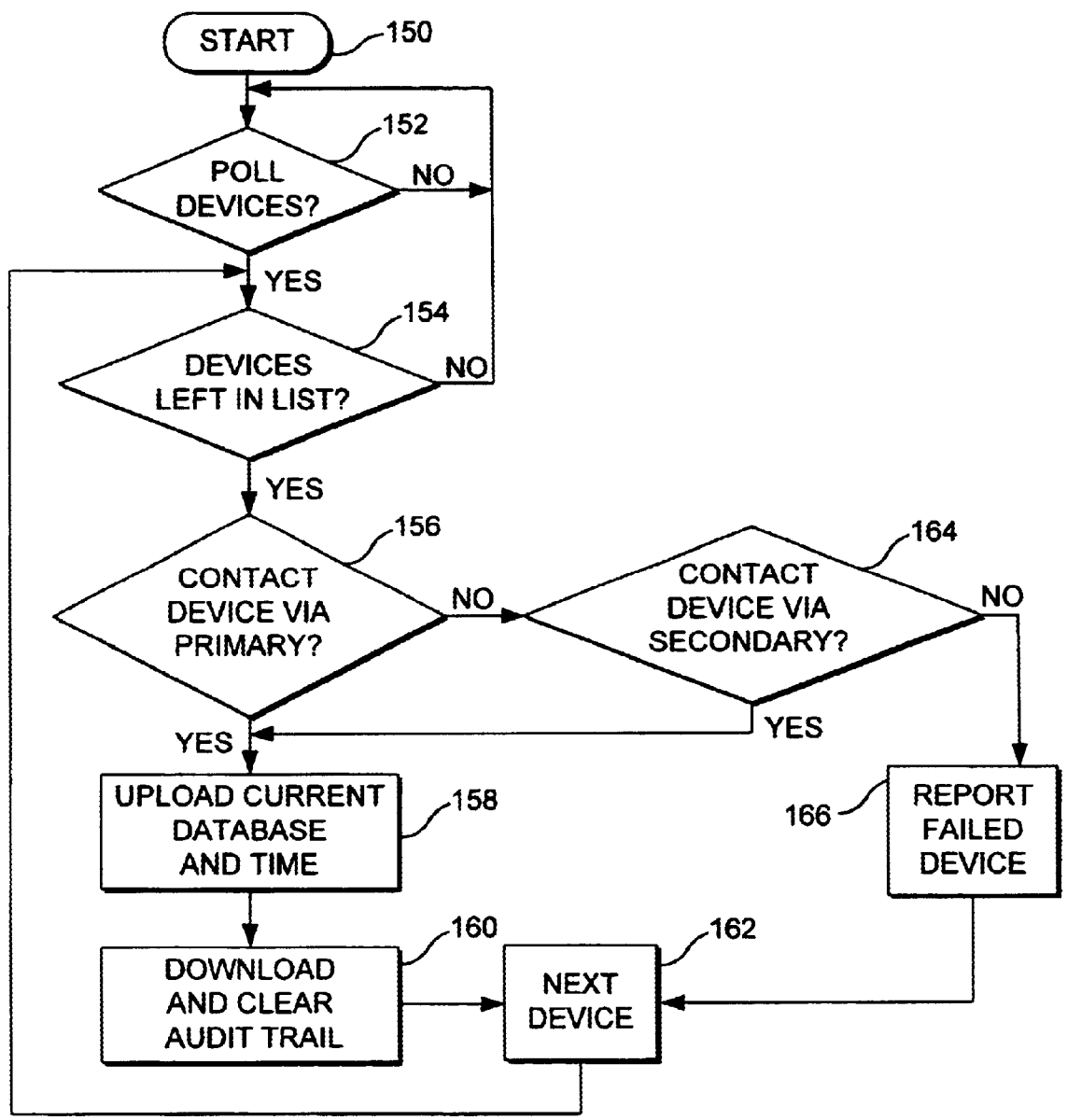
FIG. 4 is a flow chart showing the communication functions of the security system of the invention shown in FIG. 2.; and, FIG. 5 is a flow chart showing the reporting functions of the security system of the invention shown in FIG. 2.

Referring now to FIG. 4, the manner of distributing data to the databases resident at each of the security gates and of collecting data for reports is now described. The distributed database management program is provided with a default communications setting dependent upon the needs of the network being served. Accordingly, the either logical pathway referred to supra in CONNECT VIA NETWORK block 112 is considered the primary pathway. The uploading and downloading of information is accomplished through polling the devices with security gates and stepping through the list of such devices in a recirculating manner. This portion of the distributed database management commences at START block 150 whereafter a prompt in the form of a query POLL DEVICES? block 152 is presented. If YES is selected, this query is followed by the query DEVICES LEFT IN LIST? block 154. Upon either of these queries resulting in a negative finding the program returns to he point of beginning and restarts automatically. If the query of DEVICES LEFT IN LIST? block 154 results in a positive response, then a contacting of or a reporting of a failed device is elicited. With the default arranged as described, communication is established CONNECT VIA NETWORK block 112 at CONTACT DEVICE VIA PRIMARY block 156. During normal flow of data the database uploading is accomplished at UPLOAD CURRENT DATABASE AND TIME block 158 and data collection is accomplished at DOWNLOAD AND CLEAR AUDIT TRAIL block 160. Thereafter, the logical pathway recirculates through NEXT DEVICE block 162 to the second query DEVICES LEFT IN LIST? block 154. If the contact via the primary setting fails at block 154, the program continues to establish contact (as, for example when the network server is inoperative) by CONTACT DEVICE VIA SECONDARY block 164. Here, if contact is attained, the communications is through the dial-up modem or out-of-band channel and proceeds as before. Although not shown, alternate or tertiary means of communication are optionally insertable between blocks 164 and 166. Upon all means of contacting the device failing, a REPORT FAILED DEVICE, block 166 message is transmitted and, thereafter, the logical pathway recirculates through NEXT DEVICE block 162 to the second query, DEVICES LEFT IN LIST? block 154. Upon exhausting the devices in the list, the program returns to the point of beginning and restarts automatically.

Figure 5:
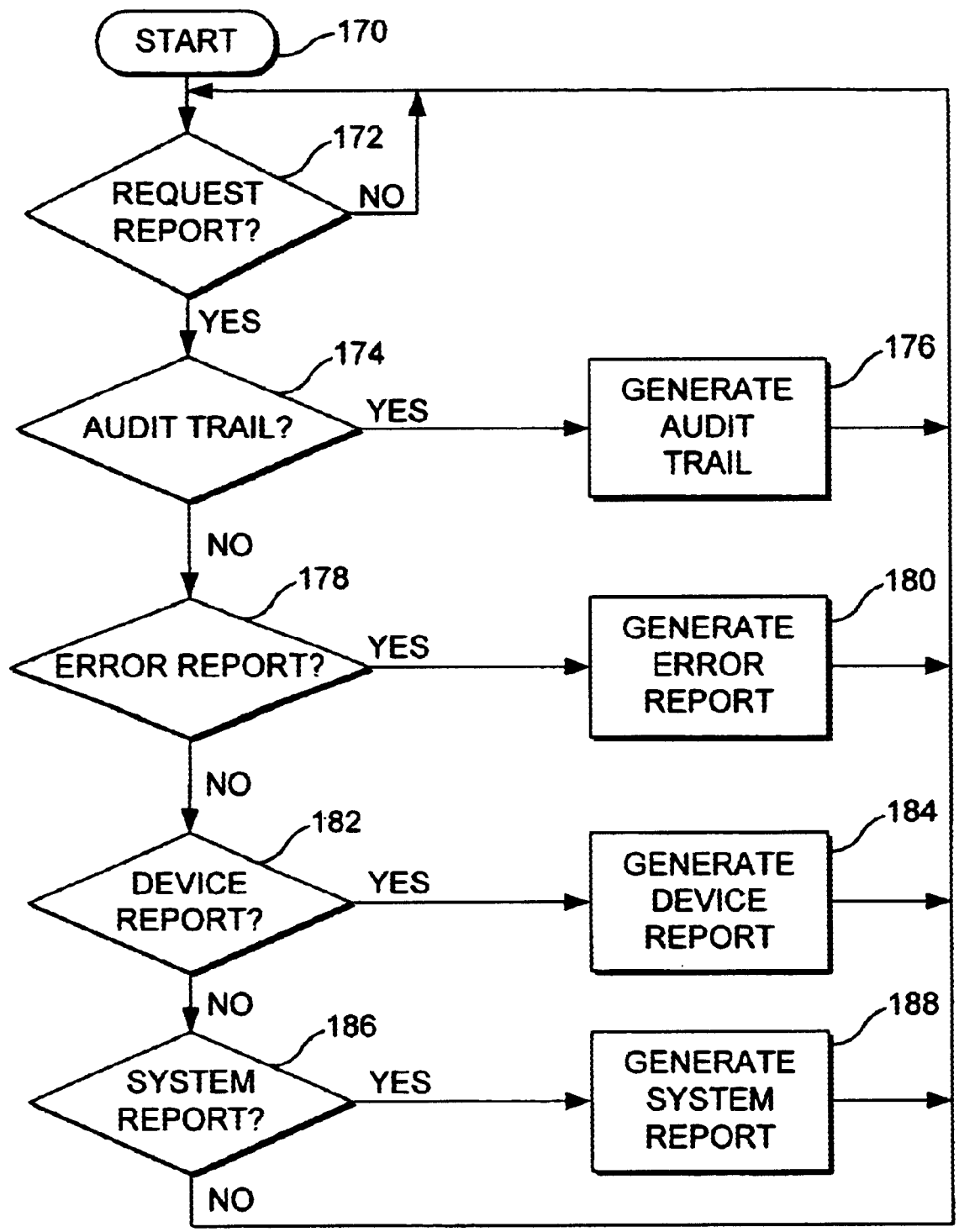

Referring now to FIG. 5, the logical pathway for reporting function of the management system for distributed out-of-band security databases is next shown. Here, the data collected during the preceding process is formatted according to request. The audit trail report shows all users accessing the unit, the rate, the length of connection, and the action taken (logon, connect to host, invalid user). The error report, based on the same data, shows for security management all invalid user requests. The device and system reports utilize the REPORT FAILED DEVICE block 166 messages in formats for specific devices or for all system network elements. Here, the logical pathway commences at START block 170 and the use is prompted by the query REQUEST REPORT? block 172. Upon a positive response, the each form of the reports is presented in a query which, upon selection, generates the report. The acceptance of AUDIT TRAIL? block 174 leads to GENERATE AUDIT TRAIL block 176; of ERROR REPORT? block 178, to GENERATE ERROR REPORT block 180; of DEVICE REPORT? block 182, to GENERATE DEVICE REPORT block 184; and, of SYSTEM REPORT? block 186, to GENERATE SYSTEM REPORT block 188. The decline by the use in response to a specific report format query steps the user through to the next successive format available. The exhaustion of the list of formats or the completion of the generate report order returns the users to the point of beginning.

In operation, security is provided for distributing out-of-band databases by having a centralized distributed database manager and the above described software program therefor. The distributed database manager operates by polling a list of devices and communicating with all network elements having an out-of-band port. These elements are equipped with a security gate and a security database. The distributed database manager operates by communicating through both in-band and out-of-band channels. The program serves as a distributor of encrypted updated data and as a collector of encrypted transactional records.

During the operation of the above system, authentication between a remote user and the security device of this invention occurs. First, the remote user's credentials are entered into the distributed database manager. Such credentials include the identification, the password, and the encryption key. Optionally, this is in the form of a digital certificate or some other secure authentication protocol. The distributed database manager then updates all or, depending on the access clearance granted to the remote user, selected ones of the remote security databases at the security gates, described supra. This update uses any of various encryption formats, such as an X9.17 key exchange with Triple DES encryption. In the authentication process, the remote technician uses either a hardware token with a challenge response or Dual Reflexive Key, (CDI Token, Communications Devices Inc., Clifton, N.J. 07011), see U.S. Pat. No. 5,636,280. Using the CDI Token, the remote technician dials the dial-up modem with the security gate and the security database to initiate the authentication. Then, the distributed database manager authenticates using the dual reflexive key with triple DES encryption for privacy of data. Once authenticated, the remote user gains access to the protected network element. Using a challenge response token the remote technician dials into the dial-up modem with the security gate and enters his identification. The security gate then looks up the user's key and generates a random 8-digit number which is transmitted to the remote technician. The technician then enters this number in the challenge response card which, using data encryption and a private key, calculates a unique 8-digit response. This is then transmitted to the security gate for comparison to the same process at the gate. This latter authentication process is in the public domain and is known as a "shared secret". While only two authentication processes are described, other authentication devices like a pager token, are usable with this system. For example, upon receipt of a one-time password via pager, the remote technician transmits the password to the security gate for authentication. If the remote technician utilizes a CDI Token remote encryptor, then the entire session, including all communications from the distributed database manager is in encrypted form. This ensures that the distributed database manager and the associated network elements are secure. Then, the distributed database manager authentidates using the dual reflexive key with triple DES encryption for privacy of data.

The operational methodology includes the steps of:
(1) polling a list of network elements having an out-of-band port;
   (A) communicating through the selected primary channel (in-band) to specific network elements;
   (B) when the primary channel is not available, communicating with the specific network element through the secondary channel (out-of-band);
(2) entering updated authenticated information into the database receptor thereof;
(3) receiving transaction data from the transaction register of the network element database and setting the transaction register to zero;
(4) upon failure of communication with a network element registering a device failure report; and,
(5) as required, formatting the transaction records and the device failure reports into an audit report, an error report, a device failure report and a system report.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A system for managing distributed databases, each database associated with an out-of-band port of a wide area network element, said wide area network having a centralized security system for in-band security, said system for managing distributed databases comprising:
   an out-of-band security gate at each said network element, said security gate having a database receptor;
   at least one security database capable of deposition within said database receptor of said security gate, said at least one security database, in turn, further comprising:
      a plurality of security databases each providing an interrelated hierarchical series of authentication data for a different set with each successive one of said security databases being more restrictive as to access by remote users to said network elements thereby;
   a distributed database manager for replicating and updating each said security database, said distributed database manager depositing a replicate of said security database at each said database receptor, and, upon changes to said security database, impressing such changes upon the deposited replicate.

2. A system for distributed database management as described in claim 1, wherein said distributed database manager further comprises:
   a list of network elements each having an out-of-band port, a security gate thereto, and a database receptor; and,
   a polling program therewithin having the ability to step through said list of network elements and replace the security database with an updated security database.

3. A system for distributed database management as described in claim 2, wherein each said security database comprises:
   a transaction register to record data of access request, grants, and denials; and,
   wherein said polling program further comprises:
      a data collection portion for receiving said record data from said transaction register at the time the security database is updated and for, upon receiving the data from the register, resetting he register to zero.

4. A system for distributed database management as described in claim 3, wherein said polling program further comprises:
   a failure monitoring portion wherein each network element beyond the reach of said communication program is identified.

5. A system for distributed database management as described in claim 4, wherein said distributed database manager further comprises:
   a report program to format the data received from said data collection portion and said failure monitoring portion.

6. A system for distributed database management as described in claim 1 wherein said distributed database manager further comprises:
   a communication program therewithin with the default setting of an in-band connection to the security database; and,
   said communication program, in turn, further comprising a communication channel selector to change to an out-of-band connection to the security database.

7. A system for distributed database management as described in claim 1, wherein said distributed database manager further comprises:
   a communication program therewithin the out-of-band setting of an in-band connection to the security database; and,
   said communication program, in turn, further comprising a communication channel selector to change to an in-band connection to the security database.

8. A system for distributed database management as described in claim 1, wherein said plurality of databases are an interrelated hierarchical series of authentication data with each successive one of said databases being more restrictive as to the accessibility of the network elements by said remote users.

9. A distributed database management device serving network elements of a wide area network having, for in-band access by a remote user a centralized security system, said distributed database management device comprising:
   a central processing unit (CPU);
   a list of network elements within said CPU each having an out-of-band port, a security gate thereto, and a database receptor;
   a plurality of interrelated hierarchical series of authentication data within said CPU capable of being replicated by said CPU, and a selected one of said interrelated hierarchical series of authentication data providing deposited security databases in each said database receptor with each successive one of said security databases being more restrictive as to access by remote user to said network elements thereby; and,
   a management program in said CPU capable of communicating with each network element through in-band and out-of-band connections and of depositing at the database receptors said replicated database.

* * * * *